United States Patent [19]

Johnson

[11] Patent Number: 4,670,411

[45] Date of Patent: Jun. 2, 1987

[54] PROCESS FOR PREPARING TANTALUM (V) CHLORIDE/FLUORINE/OXIDE-METAL OXIDE COMPOSITIONS

[76] Inventor: Thomas H. Johnson, 15310 Beechnut, Houston, Tex. 77083

[21] Appl. No.: 791,882

[22] Filed: Oct. 28, 1985

[51] Int. Cl.⁴ .................... B01J 29/28; B01J 21/16; B01J 27/12

[52] U.S. Cl. ........................... 502/60; 502/80; 502/84; 502/224; 502/231

[58] Field of Search ................. 502/60, 80, 84, 224, 502/231

[56] References Cited

U.S. PATENT DOCUMENTS

| | | | |
|---|---|---|---|
| 3,975,299 | 8/1976 | Cratnorne et al. | 502/224 X |
| 4,469,804 | 9/1984 | Johnson | 502/224 X |
| 4,489,171 | 12/1984 | Johnson | 502/224 X |
| 4,489,212 | 12/1984 | Johnson | 502/224 X |

*Primary Examiner*—Patrick P. Garvin

[57] ABSTRACT

A process for the preparation of metal oxide substrates having tantalum (V) chloride/fluoride/oxide bound to the surface thereof.

3 Claims, No Drawings

PROCESS FOR PREPARING TANTALUM (V) CHLORIDE/FLUORINE/OXIDE-METAL OXIDE COMPOSITIONS

FIELD OF THE INVENTION

This invention relates to a process for preparing a metal oxide substrate having a mixture of tantalum (V) chloride/fluoride/oxide bound to the surface thereof.

BACKGROUND OF THE INVENTION

The tantalum pentahalides are known to be useful as catalysts in various organic reactions. See for example, Friedel-Crafts and Related Reactions, Volume 1, G. A. Olah, Ed., Interscience, 1963, New York. A means of providing tantalum pentahalide distributed over a "support" would be very useful, both from an economic point of view and from a handling point of view. The main problem to date in supporting tantalum (V) halides on a support is that tantalum pentahalides are basically only soluble in solvents in which they react and thus the usual techniques of impregnation to obtain a metal loading of tantalum (V) halide can not be utilized. The instant invention provides a solution to this problem. The process of the instant invention provides for the formation of tantalum (V) chloride/fluoride/oxide bound to the surface of a metal oxide substrate.

The formation of tantalum (V) halide/oxide compositions is the subject matter of a patent filed as application Ser. No. 527,535, on Aug. 29, 1983, and which is now U.S. Pat. No. 4,489,171, issued on Dec. 18, 1984. In U.S. Pat. No. 4,489,171, the tantalum (V) halide/oxide compositions having mixtures of chloride and fluoride were prepared by subliming tantalum pentachloride, reacting the sublimed tantalum pentachloride with a metal oxide substrate, contacting the product therefrom with an oxygen-containing atmosphere and subsequently reacting the product with a fluorinated hydrocarbon. When preparing these mixed chloride and fluoride metal oxide compositions, it was thought necessary, due to thermodynamic considerations, to contact the tantalum (V) chloride/oxide-metal oxide with an oxygen-containing gas or a chemical compound containing oxygen prior to contact with a liquid or gaseous fluorinated hydrocarbon. It has now been found that tantalum (V) chloride/oxide-metal oxide compositions can be converted directly to mixed chloride and fluoride metal oxide compositions without the presence of oxygen, thereby eliminating the problems caused by the presence of oxygen, ie. reaction with oxygen is an exothermic reaction which may damage the catalyst.

SUMMARY OF THE INVENTION

This invention relates to a process for preparing a mixture of tantalum chloride and fluoride containing metal oxide compositions. The compositions produced by this process comprise a solid metal oxide substrate having tantalum (V) chloride/fluoride/oxide bound to the surface of the substrate. As used herein, the term "tantalum (V) chloride/fluoride/oxide" refers to compositions in which the pentavalent tantalum is bound to chloride, fluoride or mixtures of chloride and fluoride in various combinations. These mixed chloride and fluoride compositions are useful as catalysts. In general they are prepared by reacting a substantially anhydrous metal oxide having surface hydroxyl groups with tantalum pentachloride in the vapor state in a first step and contacting the product with a liquid or gaseous fluorinated hydrocarbon in a second step. A preferred method of preparation is to sublime tantalum pentachloride and react the vapor therefrom with a substantially anhydrous metal oxide, and thereafter contact the sublimed tantalum pentachloride with a liquid or gaseous fluorinated hydrocarbon. Preferred oxides are aluminum oxide gels, silicon oxide gels and silicon-aluminum oxide gels.

DESCRIPTION OF THE PREFERRED EMBODIMENTS

The mixed chloride/fluoride compositions prepared by the process of the instant invention comprise pentavalent tantalum (also written as tantalum (V)), chlorine or fluorine (chloride or fluoride), oxygen (or oxide) and a solid metal oxide substrate wherein at least one valence of tantalum is bound to oxygen, which oxygen is bound to the substrate, at least one valence of the tantalum is bound to chlorine or fluorine and the remaining tantalum valences are bound to chlorine or fluorine and/or oxygen.

The metal oxides that are useful as substrates in the process of the instant invention are those inorganic oxides which have hydroxyl groups attached to the surface of the substrate. The hydroxyl groups provide the means by which the tantalum pentachloride are bound by reaction to the surface of the substrate. The scope of the invention is broad and any metal oxides which have surface hydroxyl (or oxyhydroxyl) groups can be utilized in the process.

The term "metal oxide", although used herein in the singular tense, is meant to include the single oxides such as silica, or alumina as well as plural and complex oxides such as silica-alumina, silica-aluminathoria, zeolites and clays.

The preferred metal oxide substrates used in the instant process are the porous solid inorganic oxides which contain surface hydroxyl groups and which are conventionally used as catalysts and catalyst supports. Non-limiting examples of these types of materials include those having a major component of silica or alumina or both, such as, for example alumina and aluminous materials, silica and siliceous materials; clays, particularly open lattice clays; and crystalline aluminosilicates (zeolites). Non-limiting examples of aluminous and siliceous materials include, for example, silica-alumina, silica-magnesia, silica-zirconia, silica-titania, alumina-chromia, alumina-ferric oxide, alumina-titania as well as ternary compositions such as, for example, silica-alumina-titania, silica-alumina-zirconia, etc. Non-limiting examples of crystalline aluminosilicates useful as substrates include synthetic zeolites such as, for example, A, X, Y, L and ZSM types such as ZSM-5 and others and naturally occurring zeolites, such as erionite, faujasite, mordenite, sodalite, cancrinite and others. Non-limiting examples of open lattice clays useful as substrates include bentonite, montmorillonite and others. In a preferred embodiment, the metal oxide should have a major component of silica or alumina or both.

Particularly suitable as substrates in the instant process are those solid inorganic oxide compositions known as metal oxide gels or gel oxides. The gel oxides which are particularly suitable for use in the process of the instant invention are any of the oxide gels that are well known in the catalyst art useful as either catalyst base materials or as promoting materials in catalyst compositions. Additionally, the term "metal oxide gel"

or "gel oxide" as used herein shall also include the plural oxide gels, i.e., those that contain mixtures or compounds of two or more metal oxides. A metal oxide gel is basically a metal oxide that contains chemically bound water in the form of hydroxyl groups or oxyhydroxyl groups as opposed to adsorbed water and water of hydration, although adsorbed water and water of hydration may also be present. They are typically prepared by the precipitation of the metal component(s) in an aqueous medium. Upon calcination at sufficiently elevated temperatures, water is given off and the gel is converted to the oxide with two hydroxyl moieties giving one molecule of water and an oxygen is attached to a metal ion. Illustrative of gel oxide base materials used in the process of this invention are aluminas, silicas, alumina-silicas, alumina-zirconias, silica-zirconias and the like, including naturally occurring hydrous oxide materials such as clays, such as, for example, the kaolinites, the montmorillonites and the like. Among the clays the open lattice clays are particularly desirable. Also included are the zeolites, both natural and synthetic. The structure of the gel oxides can range from amorphous to highly crystalline. Preferred oxide gel materials are selected from the group consisting of alumina, silica, alumina-silica, crystalline aluminosilicates (zerolites) and open lattice clays.

Since the tantalum (V) chloride/oxide is bound to the surface of the metal oxide substrate by a reaction of tantalum pentachloride with the metal oxide substrate through a hydroxyl moiety, the metal oxide substrate must have pendant surface hydroxyl groups attached to the surface. Before reaction, the metal oxide substrate must have pendant surface hydroxyl groups, whereas, after reaction, the metal oxide substrate may or may not have surface hydroxyl groups, depending on the degree of reaction with the tantalum pentachloride.

Prior to use in the instant process the hydroxyl-containing metal oxide substrate should be substantially free of absorbed water, i.e., "substantially dehydrated or anhydrous". The absorbed or free water is removed by heating the substrate at temperatures ranging from about 100° C. to about 900° C. prior to contact with the tantalum pentachloride vapor. Any environment that provides for drying is suitable such as air, vacuum, inert gas such as nitrogen, etc. The dried metal oxide substrate should be kept away from a humid atmosphere after drying. It is understood that a dried metal oxide substrate prior to use in preparing the instant compositions will still contain chemically bound water in the form of hydroxide and oxyhydroxide.

An aluminum oxide gel is one of the preferred substrates. This alumina can be any of the variety of available aluminas. These are commercially available under various names such as alumina gels, activated aluminas, gamma aluminas, etc. Regarding purity of the alumina, it may be stated that small amounts of impurities are not generally detrimental, and may be beneficial when the impurity is present as a co-gel. In fact "impurities" may be purposely added for catalytic effects.

The following table lists several commercial aluminas and their properties which are found suitable.

| Alumina | Surface Area, $m^2/g$ | Pore Vol., cc/gm | Na, ppm | $SO_4^=$, % wt | $Fe_2O_3$ % wt | $Cl^-$, % wt |
|---|---|---|---|---|---|---|
| CCI[a] | 252 | 0.8 | 160 | 0.06 | — | 0.02 |
| KA-201[b] | 365 | 0.42 | 600 | 0.03 | — | 0.01 |
| RA-1[c] | 263 | 0.26 | 4700 | 0.02 | 0.18 | — |
| ACCO[d] | 225 | 0.68 | 580 | 0.6 | — | 0.6 |
| Norton | 218 | 0.62 | 51 | 0.03 | — | 0.03 |

[a]Catalysts & Chemicals, Inc., now United Catalysts
[b]Kaiser
[c]Reynolds Corporation
[d]American Cyanamid Corporation
[e]Conoco Corporation
[f]Filtrol Corporation Silica gel is also another preferred substrate. These are readily available commercially and are essentially substantially dehydrated amorphous silica. These materials are available in various density grades, from low density with surface areas ranging from about 100–300 $m^2/g$ to regular density with surface areas up to about 800 $m^2/g$. The commercially available materials are used as dessicants, selective absorbents, catalysts and catalyst supports. Regarding purity of the silica, it may be stated that small amounts of impurities are not generally detrimental and may be beneficial when the impurity is present as a co-gel. In fact, "impurities" may be purposely added for catalytic effects. The following table lists several commercial silicas and their properties which are found suitable.

| Support | Surface Area, $m^2/g$ | Pore Vol., cc/g | Density g/cc | Particle Size |
|---|---|---|---|---|
| Davison* Grade 952 $SiO_2$ | 300 | 1.65 | 0.35 | 70 mesh |
| Davison Grade 59 $SiO_2$ | 300 | 1.15 | 0.38 | 8 mesh |
| Davison Grade 57 $SiO_2$ | 300 | 1.0 | 0.4 | 100 mesh |
| Davison Grade 12 $SiO_2$ | 700 | 0.54 | 0.75 | 20 mesh |
| Davison Grade 03 $SiO_2$ | 750 | 0.43 | 0.7 | 8 mesh (avg) |

*Manufactured by Davison Chemical Div., W. R. Grace & Co.

Other preferred substrates are the aluminosilicates. These materials contain various mixtures of aluminum and silicon oxides. They are readily available commercially and are generally employed as cracking catalysts. Typically they contain from about 50 to about 95, preferably from about 70 to about 90 percent by weight of silica. Illustrations of commercially available alumina-silicas are Davison Grade 980-25 (manufactured by Davison Chemical Division, W. R. Grace & Co.) which contains about 75% $SiO_2$ and 25% $Al_2O_3$ and Davison Grade 980-13 which contains about 87% $SiO_2$ and 13% $Al_2O_3$. These materials can be prepared in a conventional fashion, as for example by co-precipitation, co-gellation, or by spray drying.

Encompassed within the term "aluminosilicates" are most of the zeolites. The zeolites are found to be specifically useful as substrates. Zeolites are ordered, porous crystalline aluminosilicates having a definite crystalline structure within which there are a large number of small cavities which are interconnected by a number of still smaller channels. Zeolites useful as substrates may be either synthetic or natural. At least 34 species of zeolite minerals are known and the synthetic zeolites number in the hundreds. Any zeolite will be useful as a substrate provided that the zeolite, prior to reaction with tantalum pentachloride, contains chemically bound water in the form of hydroxyl groups. Depending on the state of reaction, the reacted product may contain no hydroxyl groups, if all such groups were reacted with the tantalum pentachloride, or there may be unreacted hydroxyl groups still present.

The techniques for the preparation of the tantalum pentachloride intermediates are well known in the art. Typically, tantalum pentachloride is prepared by passing dry chlorine over tantalum metal at a temperature above 200° C.

The metal oxide-tantalum (V) chloride/fluoride/oxide compositions of the instant invention is prepared by a process comprising reacting under substantially anhydrous and oxygen-free conditions a suitable metal oxide which has water chemically bound as hydroxyl and which is substantially free from absorbed water with tantalum pentachloride vapor and thereafter with a liquid or gaseous fluorinated hydrocarbon, and recovering the product. The metal oxide compositions thus produced have tantalum (V) chloride/fluoride/oxide bound to the surface thereof. By the term "bound" it is meant herein that the pentavalent tantalum has at least one valence bound to an oxygen which is part of the metal oxide substrate. By the term "surface" it is meant both the external and internal pore surfaces which are accessible to the tantalum pentachloride vapor during the preparative process.

Tantalum pentachloride is readily sublimed and lends itself to a preferred method of preparation which is called "reactive sublimation" wherein tantalum pentachloride is sublimed into an anhydrous, non-oxidizing atmosphere and allowed to contact and react with the hydroxyl-containing metal or semi-metal oxide.

In the process for preparation of the tantalum chloride, by reactive sublimation, it is important that the reaction be carried out under substantially anhydrous conditions and in a neutral or reducing environment to prevent decomposition of the tantalum chloride.

In this preferred method of preparation, the tantalum pentachloride is sublimed by suitable application of temperature and/or vacuum into an essentially anhydrous and oxygen-free atmosphere where it is allowed to contact and react with a substantially anhydrous, hydroxyl-containing metal oxide substrate. Any temperature and/or vacuum which causes the tantalum pentachloride to sublime is suitable. Temperatures up to about 200° C. are suitable. Frequently the metal oxide substrate is heated during the reaction, say up to about 200° C. This heating is not critical to the preparation of the compositions utilizing this invention, but it has been found that by so heating, a more even distribution of the tantalum pentachloride on the metal oxide substrate is effected. After reaction the metal oxide composition is frequently subjected to an additional period of time at sublimation conditions without the presence of a tantalum pentachloride source. This extra step allows for any unreacted tantalum pentachloride to be sublimed off of the metal oxide composition. The metal oxide substrate before use is frequently subjected to a heat treatment to remove absorbed water. Vacuum can also be applied. Generally, if the pre-treatment temperature is too low, free water will remain, and, if the temperature is too high, sintering of the metal oxide substrate will occur, both of which can adversely affect the catalytic properties of the composition. Generally, the most desirable pre-treatment temperatures of the metal oxide substrate range from about 200° to about 400° C.

It is postulated that when tantalum pentachloride reacts with the hydroxyl group of a metal oxide substrate, that the reaction may be illustrated variously as follows:

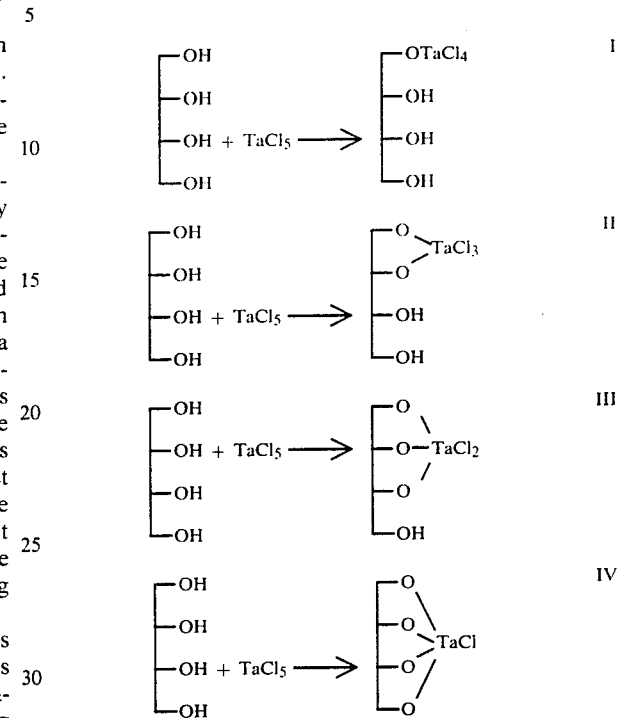

In the final composition a mixture of the above described reaction products will exist. The distribution of these reaction products is believed to be affected by reaction conditions, such as temperature. Analysis of chlorine/tantalum ratios in compositions containing about 8–17% wt. of tantalum show Cl/Ta atomic ratios of form about 2.5:1 to about 3.5 to 1.

Thus, depending on the tantalum content desired in the final composition, a tantalum pentachloride vapor is reacted with the hydroxyl-containing metal oxide substrate until a part or the whole of the hydroxyl group population of the metal oxide substrate is exhausted.

It will be apparent that products having varying tantalum contents will be suited for various purposes. Thus, the tantalum pentachloride may be reacted with the hydroxyl-containing metal oxide substrate in such amounts as is necessary to prepare products which are suitable for the particular purposes.

The reaction between the tantalum pentachloride vapor and the hydroxyl-containing metal oxide substrate is carried out at temperatures ranging from about room temperature to elevated temperatures, say to 150°–200° C. or higher. The reaction is normally carried out in an anhydrous, i.e., free from water vapor, atmosphere. The atmosphere should further be a neutral or reducing atmosphere i.e., oxygen-free. Dispersal of the tantalum pentachloride vapor in a vacuum provides a quite suitable atmosphere for reaction with the metal oxide substrate.

The metal oxide-tantalum (V) chloride/fluoride/oxide compositions of the instant invention may be produced in virtually any physical form, as for example, they may be pellets, beads, extrudates, microspheres and in other particular forms, as for example rings, saddles and the like and in porous or non-porous form.

The invention comprises a process for preparing a metal oxide substrate having tantalum (V) chloride/fluoride/oxide reactively bound to the surface of said substrate. The process comprises contacting the hydroxyl-containing metal oxide substrate in a substantially anhydrous state with tantalum pentachloride in the vapor state and allowing the vapor to react with the substrate in an atmosphere which is substantially oxygen-and water-free. In the preferred process sublimation of the tantalum pentachloride is used to put the tantalum pentahalide in the vapor state. The tantalum (V) chloride/oxide-metal oxide is then reacted with a liquid or gaseous fluorinated hydrocarbon which produces a mixture of chlorides and fluorides containing various oxychlorides, oxyfluorides, oxychlorofluorides, etc., depending on reaction conditions. Analyses of catalysts prepared in this fashion show that they contain varying amounts of chlorine and fluorine, depending on the degree of fluorination obtained using the fluorinated hydrocarbon. Reaction temperatures and pressures for the reaction with the fluorinated hydrocarbon are not critical. Temperatures of room temperature or greater are generally suitable. Different fluorinated hydrocarbons will have different optimum temperatures, pressures and times of contact, and these can readily be determined by routine experimentation. Particularly suitable fluorinated hydrocarbons are the Freons, such as, for example Freon 12 ($CF_2Cl_2$), Freon 14 ($CF_4$), Freon 23 ($CHF_3$), Freon 112 ($CCl_2F\text{-}CCl_2F$), Freon 116 ($CF_3\text{-}CF_3$), Freon 142 (chlordifluor-methyl methane), Freon C138 (octafluorocyclobutane) and similar materials. Compositions containing the fluoride are more resistant to oxygen degradation than the compositions containing chloride alone. Thus, when the mixed chloride/fluoride compositions are used as catalysts, the feeds need not be purged of oxygen and air is no longer a poison. Feeds containing oxygen (e.g., $O_2$, peroxide, etc.), however, will still compete for catalyst sites and, hence, the observed rates of reaction can be reduced.

The mixed chloride/fluoride compositions produced by the process of the instant invention find particular utility as catalysts for hydrocarbon conversions, such as, for example, alkylation reactions, isomerization reactions, oligomerization reactions, etc.

The process of the instant invention for preparing mixed chloride/fluoride compositions will be further described below by the following Illustrative Embodiments which are provided for illustration, and are not to be construed as limiting the invention.

ILLUSTRATIVE EMBODIMENTS

The following illustrates the preparation of a composition of the instant invention. A 200-ml Schlenk flask containing 50-75 g of silica gel (Davison 57, 60-100 mesh) was heated to 300° C. under a vacuum of ca. 0.1 torr for 16-20 h. The flask was moved into a dry box whereupon 6.5 g of the silica was placed on one side of a fritted Schlenk tube. Tantalum chloride (6.0 g) was placed on the other side of the frit. The $TaCl_5$ end of the tube was wrapped with heating tape and then an insulation wrap was installed along with a Thermocouple wire. A vacuum of ca. 0.1 torr was applied at the end of the silica-containing section. The deposition was carried out overnight (16-20 h) at 150° C. with the tube mounted horizontally. The siliceous material was removed in a dry box and then subjected to a vertical sublimation in order to remove any condensed but unreacted $TaCl_5$.

The following technique has also been utilized to prepare catalyst compositions which are utilized in the instant invention. This is a modification of the above described technique which produces a somewhat more homogeneous catalyst than the above technique and is utilized where uniformity is important. In this preparative technique a glass scrubbing bottle was modified by internally adding a course fritted disc which divided the bottle into a upper section and a lower section. The lower section was fitted with a stoppered connection which allowed it to be charged with tantalum pentachloride and the upper section was fitted with a vacuum stopcock connection which allowed it either to be closed off or connected to a vacuum. To the modified gas-scrubbing bottle were added about 20 g of $TaCl_5$ to the bottom section and 60 g of Davison 57 silica (−20+30 mesh, pretreated 15 300° C. under 0.1 torr vacuum for 12-24 h) to the top section. Both sections were loaded in a dry box containing a nitrogen atmosphere. The bottom section was stoppered and the top section had the vacuum stopcock closed before removing from the dry box. The bottom section of the bottle was immersed into an oil bath and heated at about 150° C. The top section was wrapped with heating tape and heated to about 150° C. A vacuum (about 0.1 torr) was applied at the top of the bottle. The heating and vacuum phase of the preparation was simultaneous and carried out over a period of 18 h. At the end of 18 h, the bottle (vacuum stopcock closed) was put back into the dry box and 20 g of fresh $TaCl_5$ was added to the bottom section. The rest of the procedure was then repeated for another 18 h. Then the silica was removed, in a nitrogen-filled dry box, and vertically sublimed at 150° C. and 0.1 torr for 18 h. This step was employed to remove any deposited but unreacted $TaCl_5$ on the silica surface. A small (<200 mg) of $TaCl_5$ was generally collected on the cold finger of the sublimator.

Twelve milliliters of the tantalum (V) chloride-silica composition was added to a fixedbed flow reactor and treated with Freon 12 ($CF_2Cl_2$) at 200° C. and 70 psi at a flow rate of 2.4 l/hr for 5 hours. The flow tube was then sealed and left under an atmosphere of Freon 12 at 200° C., 75 psi for 60 hours. Analysis of the resultant composition of the instant invention by neutron activation showed it to contain about 15.7%w Ta, 1.9%w Cl and 5.7%w F.

I claim as my invention:

1. A process for preparing a metal oxide substrate having tantalum (V) chloride/fluroide/oxide bound to the surface thereof which process consists essentially of:
    (a) subliming tantalum pentachloride and reacting in a substantially anhydrous and oxygen-free atmosphere the vapor therefrom with a substantially anhydrous metal oxide substrate having surface hydroxyl groups attached thereto,
    (b) contacting the product of step (a) with a liquid or gaseous fluorinated hydrocarbon.

2. The process of claim 1 wherein said metal oxide substrate is silica, alumina, silica-alumina zeolite, open lattice clay or mixtures thereof.

3. The process of claim 1 wherein said metal oxide substrate has a major component of silica or alumina or a mixture thereof.

* * * * *